United States Patent [19]

Colby et al.

[11] 4,227,845
[45] Oct. 14, 1980

[54] ROLLING RACK CONTROL FOR AUTOMATIC BALE WAGON

[75] Inventors: Richard A. Colby, Fresno; Leo B. Parolini, Manford; L. Dennis Butler, Kingsburg, all of Calif.

[73] Assignee: Sperry Rand Corporation, New Holland, Pa.

[21] Appl. No.: 933,234

[22] Filed: Aug. 14, 1978

[51] Int. Cl.² .................... A01D 87/12; B65G 57/32
[52] U.S. Cl. ............................. 414/39; 91/429; 414/107; 414/525 R
[58] Field of Search ............. 414/38, 39, 40, 98, 414/99, 100, 103, 106, 107, 108, 109, 516, 517, 521, 907, 525; 91/39, 429, 454; 271/214, 215, 217

[56] References Cited

U.S. PATENT DOCUMENTS

| | | | |
|---|---|---|---|
| 3,502,229 | 3/1970 | Butler | 414/39 |
| 3,635,359 | 1/1972 | Fisher | 414/39 |
| 3,819,071 | 6/1974 | Liberman | 414/517 |
| 3,901,393 | 8/1975 | Butler et al. | 414/40 |
| 3,927,771 | 12/1975 | Butler et al. | |
| 3,934,871 | 1/1976 | Dean | 414/107 X |
| 3,945,507 | 3/1976 | Olsen et al. | 414/40 |
| 4,020,962 | 5/1977 | Colin | 414/525 X |

Primary Examiner—L. J. Paperner
Attorney, Agent, or Firm—Shlesinger, Arkwright, Garvey & Dinsmore

[57] ABSTRACT

A hydraulic control system for the rolling rack of a three table bale wagon wherein the rolling rack is movable along the third table for supporting tiers of bales deposited on the third table by the second table, the control system including a single acting hydraulic cylinder for positively advancing the rolling rack to a first position wherein the third table is ready to receive tiers of bales, apparatus for selectively connecting the hydraulic cylinder with a source of hydraulic fluid under pressure for extending the hydraulic cylinder and thereby moving the rolling rack to the first position, and including a fluid flow line; selective apparatus connected with the fluid flow line for intermittent release of fluid pressure from the fluid flow line so that when mechanical pressure is exerted against the hydraulic cylinder in such a manner as to urge retraction of the cylinder, the retraction may be controlled by intermittent release of pressure from the fluid flow line.

6 Claims, 3 Drawing Figures

ROLLING RACK CONTROL FOR AUTOMATIC BALE WAGON

This invention relates generally to automatic bale wagons of the type adapted to pick up crop material bales in the field and automatically form stacks of these bales using a variety of selected tier configurations for forming a stable, interlocked stack of bales.

More particularly, this invention relates to an improved control system for the rolling rack portion of the bale wagon which is associated with the third table or load bed of the bale wagon whereupon the stack is formed.

CROSS REFERENCE TO RELATED APPLICATION

This application is related to the co-pending application Serial No. 933,233, filed Aug. 14, 1979, of C. Bryant and E. J. Wynn, entitled "Automatic Bale Wagon Control System" and may be used with the system described therein.

BACKGROUND OF THE INVENTION

Present day practice in crop harvesting utilizes the formation of bales of crop material such as hay or the like into stacks for storage by the employment of an automatic bale wagon. One type of bale wagon for use in this manner which has achieved wide spread commercial acceptance is the automatic bale wagon which employs the three table concept as originally illustrated and described in U.S. Pat. No. 2,848,172 issued to Gordan E. Grey.

The Grey bale wagon includes a first table which receives bales from a bale loader or pick up device on the wagon and accumulates a predetermined number of these bales, for example two, being arranged end-to-end in a row; a second table which successively receives the accumulated rows of bales from the first table and accumulates a plurality of such rows, such as four, five, or six rows, which plurality of rows is commonly called a tier of bales, and a third table or load bed which successively receives the tiers from the second table and accumulates a plurality of the tiers, for example, seven, to form a stack thereon. Once the stack has been accumulated on the load bed, it may be unloaded by pivoting the load bed approximately 90° and depositing the stack on the ground or the like with the first tier of bales which was previously accumulated on the second table now being the lowermost tier of the stack in contact with the ground surface.

The Grey bale wagon deposited all of the bales in such a manner that tiers were formed with all bales laying on their edge sides so that the bales forming the lowermost tier are oriented such that a none-twine or -wire bearing side of each bale, commonly referred to as an "edge" of the bale, is in contact with the ground in order to avoid wire rusting or twine rotting which eventually would result in broken bales in the lowermost tier and would probably cause topling of the stack.

In order to enhance stability of the stack, it is desirable to provide one or more tie tiers within the stack, such being tiers have individual bales arranged to overlap two bales in adjacent tiers above and below the tier. Formation of one or more of such tie tiers can be accomplished during formation of the stack on the bale wagon, for example, through utilization of a mechanism which is similar to that illustrated and described in U.S. Pat. No. 3,395,814, which has been incorporated into several present day commercial models of the Grey bale wagon.

U.S. Pat. Nos. 3,945,507 to James A. Olson et al and 3,927,771 to Lee D. Butler et al relate to improved bale wagons for facilitating the formation of a block or tied tier type stack on the wagon, and particularly, these improvements facilitate tier pattern selection and formation on the wagon as well as formation of bales into a predetermined sequence of tier patterns to form a block.

In each of the Olson et al and Butler et al patents, a control mechanism is provided wherein the bales which are picked up from the field are initially placed on the first table of the wagon and are then deposited either "on edge" or "on flat" onto the second table according to the preselected tier pattern. The particular tier pattern is formed on the second table as successive bales are deposited thereon either singly or in pairs to form tie tiers, edge tiers or flat tiers as necessary. When the complete tier has been formed on the second table, the second table, along with the formed tier, is tilted to an upright position at which time the tier is deposited onto the third table or load bed of the wagon.

The third table is provided with a "rolling rack" against which the tiers rest after they have been deposited onto the third table. The rolling rack is provided with a hydraulic cylinder which initially moves the rack to its fully forward position at which time it is ready to receive the first tier.

As the second tier of bales is deposited onto the third table, it is necessary for the rolling rack to move rearwardly slightly to accommodate the second tier. To accomplish this in the past, the hydraulic circuit for the rolling rack cylinder was provided with a pressure relief valve which may be adjusted to the desired pressure. As the second table is hydraulically raised, the second tier pushes against the first tier which in turn pushes against the rolling rack to force the same rearwardly a distance approximately equal to the thickness of one tier while the associated hydraulic cylinder retracts a distance equal to about one-half of the tier thickness. As the pressure builds up in the hydraulic cylinder and associated hydraulic lines, the pressure relief valve opens releasing the fluid and permitting the rolling rack to retract along the third table until the second table is in its full upright position at which time no further force is exerted against the rolling tack, and the pressure relief valve recloses and movement of the rolling rack stops. At this time, the second table is lowered to begin receiving more bales and forming an additional tier, after which the foregoing operation is repeated.

The use of this pressure relief valve to control the movement of the rolling rack, has proved to be disadvantageous under some certain circumstances, however. Firstly, a very precise control of the pressure relief valve is necessary. If the setting were too high, excess pressure would build up in the hydraulic system which could damage various components of the bale wagon or cause the apparatus to jam. If the pressure relief valve setting were too low, the weight of the bales against the rolling rack, particularly during movement through the field, could cause the rack to slowly retract at an improper time. Further, if four or five tiers of bales are already on the third table, greater force is necessary from the second table in order to build up the pressure sufficient to open the relief valve.

SUMMARY OF THE INVENTION

According to the present invention, an improved hydraulic system is provided which eliminates the use of a pressure relief valve for controlling the movement of the rolling rack. Although the force exerted by the second table is still used to move the rolling rack, no build up of hydraulic pressure is necessary in the present invention to permit movement of the rolling rack.

Instead, the present invention provides that the rolling rack is hydraulically locked in position by a closed hydraulic circuit until it is time for the second table to deliver a tier of bales onto the third table. Being so locked in position prevents the possibility that the rolling rack would move backward as the bale wagon travels through the field.

When a tier of bales is delivered by the second table, requiring the rolling rack to move, a solenoid valve in the hydraulic line is periodically opened to allow the rolling rack cylinder oil to return to the oil reservoir. The valve is opened several times per second, and this pulsing or short duration opening is sufficient to allow the required movement without permitting excessive movement. The pulsing of the solenoid valve is controlled by an electric oscillator control circuit which is turned on during second table tier delivery and off when the tier delivery is complete.

This system also provides the benefit of opening the solenoid valve to the oil reservoir storage tank so that the force required to move the rolling rack is reduced to a minimum allowing for maximum pushback force to be exerted on the tier being delivered.

Thus the primary object of the present invention is to provide an improved hydraulic circuit arrangement for controlling the movement of the rolling rack on a bale wagon.

The present invention is particularly adapted for use on the automatic bale wagon disclosed in co-pending application Ser. No. 933,233 filed Aug. 14, 1979 by Edward J. Wynn et al and entitled "Automatic Bale Wagon Control System", This application utilizes electronic counting and memory circuitry for controlling the various functions of the bale wagon and through the use of the electronic system, control of the solenoid valve of the present application is readily accomplished.

Other objects and advantages of the present invention will become apparent to those skilled in the art when viewed in light of the accompanying specification and drawings.

DESCRIPTION OF THE DRAWINGS

During the following detailed description of this invention, reference will be had to the accompanying drawings in which.

DETAILED DESCRIPTION OF THE INVENTION

Figure 1:
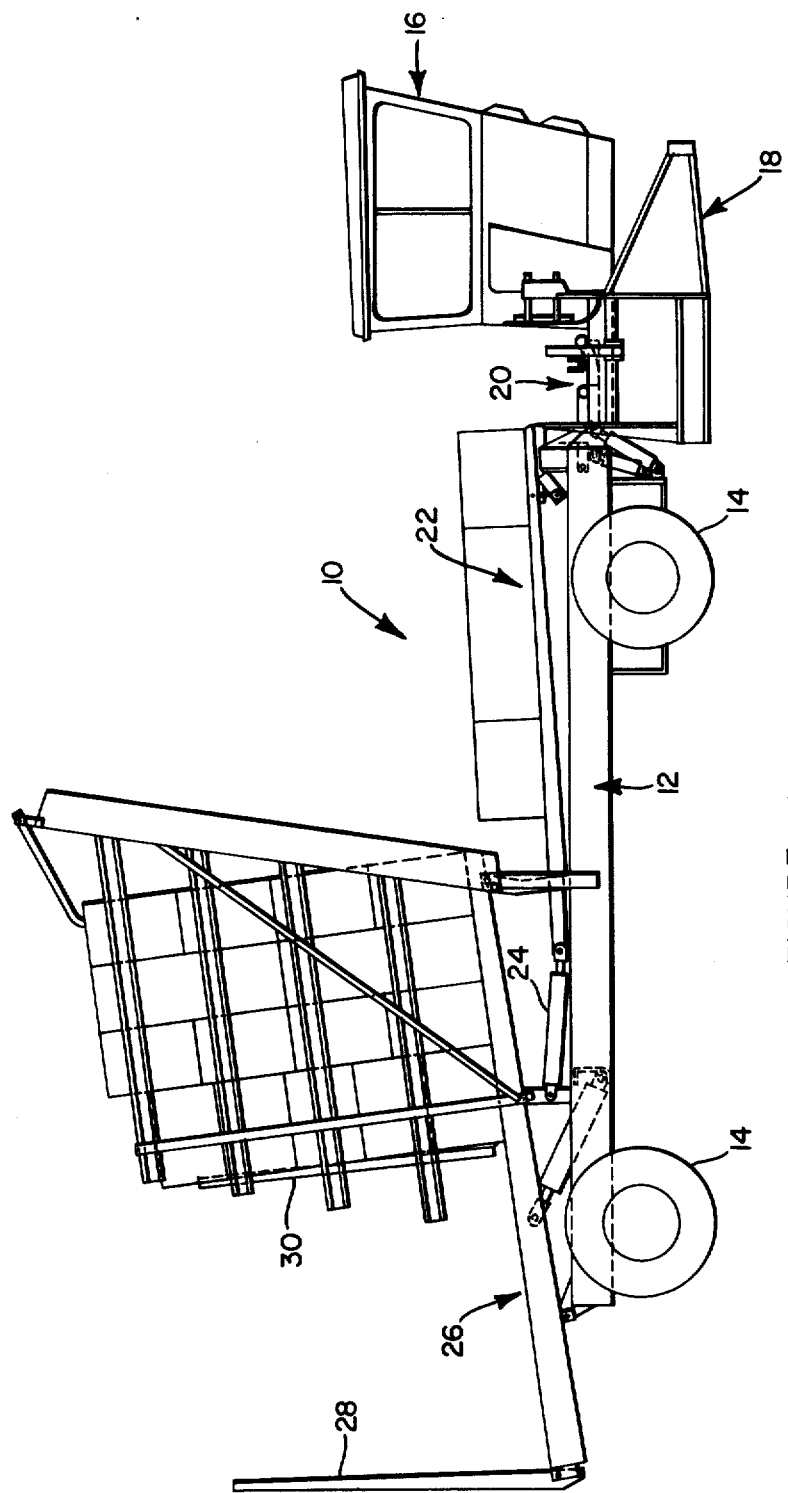
FIG. 1 is a side elevational view of a bale wagon embodying the principles of the present invention, showing the bale wagon with a partially formed block-type stack of bales on its third table or load bed and during a formation of a tier of bales on its second, tier forming table.

Referring firstly to FIG. 1, the bale wagon generally designated 10 is provided with a mobile chassis generally designated 12 provided with wheels 14 and an operator cab 16. The cab 16 also includes the various controls both for operation of the bale wagon as a vehicle and for operation of the various bale loading and stacking portions of the machine.

The bale wagon 10 is also provided with a bale loader generally designated 18 which picks the bales from the field and deposits them on the first table 20. The bales which are picked up by the bale loader 18 and deposited on the first table 20 are then transferred in the required preselected manner onto the second table generally designated 22. The second table 22 is pivotally mounted and suitably connected to a hydraulic cylinder 24 capable of tilting the second table 22 through an angle of approximately 90° from the position shown in FIG. 1 upwardly for depositing the formed tier of bales onto the third table 26.

The operation of the bale wagon is more fully described in the specifications of U.S. Pat. Nos. 3,945,507 and 3,927,771 which are incorporated herein by reference.

At the rearmost end of the third table 26 are provided a plurality of support tines 28. Additionally, the third table 26 is provided with a rolling rack 30.

Figure 2:
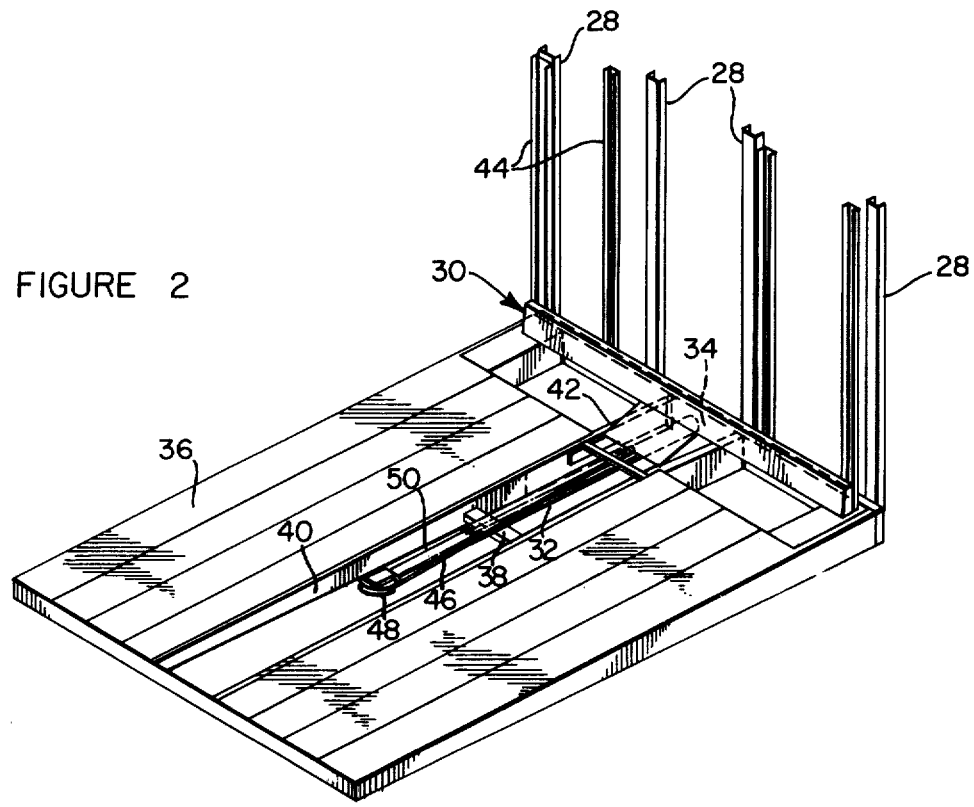
FIG. 2 is an enlarged, perspective view of the load bed, rolling rack and rolling rack hydraulic cylinder of the bale wagon of FIG. 1.

At the start of the bale wagon operation for forming any one of the stack patterns, the rolling rack 30 is positioned near the forward end of the load bed 26, preferably about 23 inches therefrom to accommodate the width of one tier. The rolling rack 30 is initially moved to such position by means of its cylinder 32 as seen in FIG. 2. The cylinder 32 is of a single-acting type having its anchored end secured to a rear beam 34 of the load bed platform assembly 36. The cylinder 32 extends within a longitudinal slot 40 in the platform assembly 36, and is clamped near its forward end to a transverse brace 38 located generally at the longitudinal middle of the assembly 36 and bridging the slot 40.

The rolling rack 30 includes a carriage portion 42 which supports a plurality of upright support members 44 and is mounted within the assembly slot 40 for fore-and-aft movement along the load bed 26. A cable 46 is secured at one end to the carriage portion 42, extends therefrom in a forward direction about a pulley 48 rotatably mounted on the piston rod end 50 of the cylinder 32, and finally extends therefrom in a rearward direction to its other end which is secured to the brace 38. Thus extension of the cylinder 32 moves the rolling rack from the rear to near the front of the load bed 26 such that cylinder extension is equal to one-half the total distance of rack movement.

Figure 3:
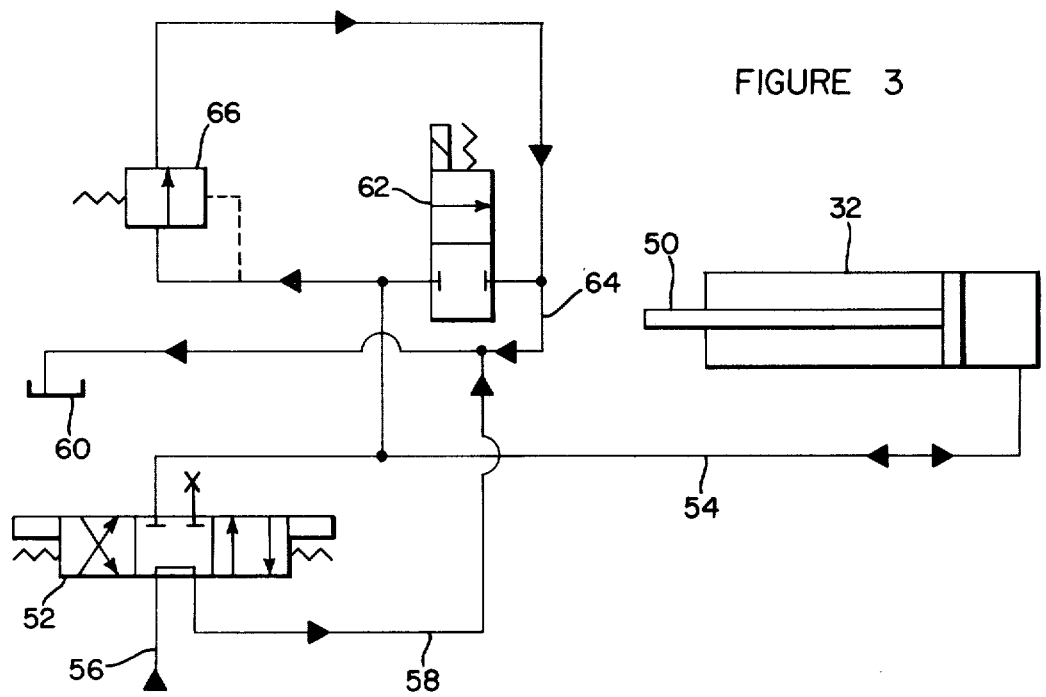
FIG. 3 is a schematic representation of the hydraulic circuit associated with the rolling rack cylinder.

Referring now to FIG. 3, the rolling rack cylinder 32 is seen to be connected to a valve 52 by means of fluid line 54. A fluid line 56 connects valve 52 with a suitable source (not shown) of hydraulic fluid flowing under pressure. With the valve in the position shown in FIG. 3, the fluid exists from the valve 52 through line 58 to the hydraulic oil reservoir 60.

Valve 52 is a solenoid operated valve, and when it is desired to extend the piston rod 50 from the cylinder 32 and thereby advance the rolling rack 30, valve 52 is shifted to its right position which admits hydraulic fluid to the cylinder 32 causing extension of the piston rod 50. After the piston rod 50, and thus the rolling rack 30, have been extended to the desired position, valve 52 is caused to return to its center position at which time return flow of fluid through line 54 is blocked.

Line 54 is also in communication with a solenoid valve 62. When it is desired that the rolling rack move, for example when a tier of bales is being delivered to the load bed, valve 62 is caused to intermittently shift from the blocking position as seen in FIG. 3 to the flow permitting position. This pulsating movement of valve 62 permits an intermittent return of fluid through line 64 to the reservoir 60. During the cycling of valve 62, valve 52 remains in its central position whereby return flow of fluid through valve 52 is blocked. Control of the solenoid valve 62 during its intermittent movement is accomplished through a conventional electronic oscillator circuit (not shown) as a control for the solenoid of the valve.

As a safety feature, a pressure relief valve 66 may also be provided in the event of failure of the electronic circuitry or solenoid valve 62, to prevent damage to the machine through excessive pressure build-up. Valve 66 would be preset to open at a pressure higher than the ordinary operating pressure of the system in order to act in this manner and prevent interference with normal operation of the hydraulic system. In some circumstances, valve 66 may open at a time when solenoid 62 is in its fluid flow blocking position, during cycling of valve 62, due to the pressure build-up which may occur as the second table is exerting pressure on the rolling rack.

While this invention has been described as having a preferred design, it will be understood that it is capable of further modification. This application, is therefore, intended to cover any variations, uses, or adaptations of the invention following the general principles thereof and including such departures from the present disclosure as come within known or customary practice in the art to which this invention pertains, and as may be applied to the essential features hereinbefore set forth and fall within the scope of this invention or the limits of the claims.

What is claimed is:

1. In a bale wagon having a rolling rack movable along the load bed thereof for supporting tiers of bales deposited on said load bed by the tier forming table, the improvement which comprises:

a single acting hydraulic cylinder for positively advancing said rolling rack to a first position, means for selectively connecting said hydraulic cylinder with a source of hydraulic fluid under pressure for extending said hydraulic cylinder and including a fluid flow line, oscillator means connected with said fluid flow line for selective intermittent release of fluid pressure from said fluid flow line so that when mechanical pressure is exerted against said hydraulic cylinder in such a manner as to urge retraction of said hydraulic cylinder, such retraction may be controlled by intermittent release of pressure from said fluid flow line.

2. A bale wagon as in claim 1 and wherein said oscillator means for selective intermittent release of fluid pressure includes valve means.

3. A bale wagon as in claim 2 and wherein said valve means is operable between a flow permitting position and a flow blocking position.

4. A bale wagon as in claim 3 and wherein said valve means is a solenoid valve.

5. A bale wagon as in claim 4 and including pressure relief valve means in said fluid flow line operable for releasing fluid pressure in the event of excessive system pressure.

6. A bale wagon as in claim 4 and wherein said oscillator means includes an electronic oscillating circuit for intermittently operating said solenoid valve during delivery of a tier of bales from said tier forming table to said load bed.

* * * * *